Oct. 3, 1967 WOLF-DIETER BENSINGER 3,344,778
ROTARY PISTON ENGINE
Original Filed May 14, 1963
FIG. 1
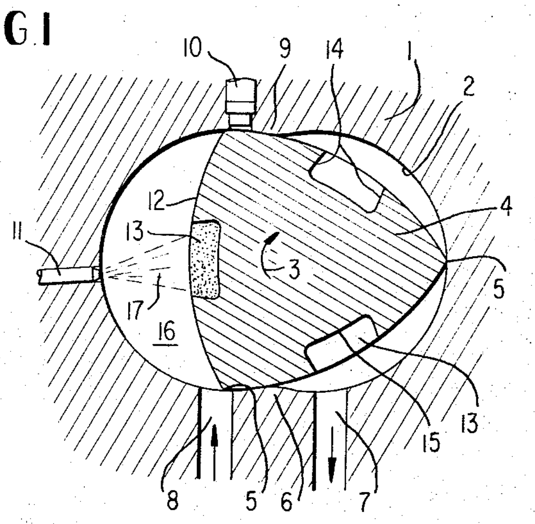
FIG. 2
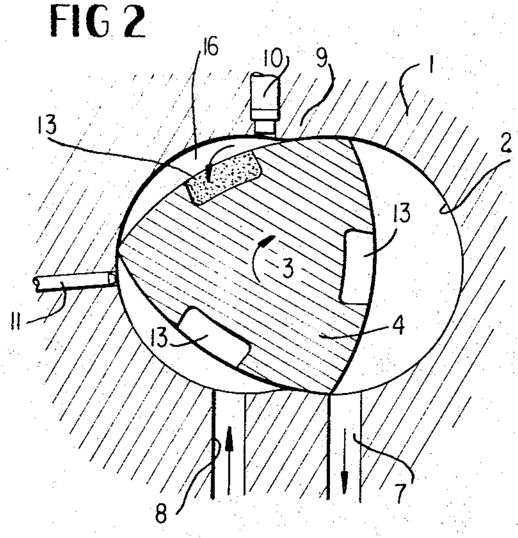
FIG. 3
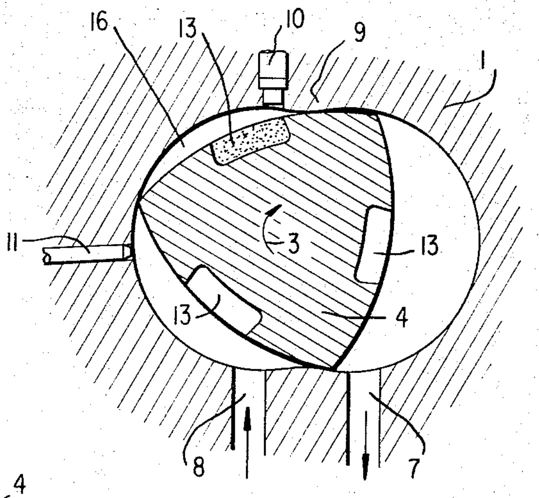
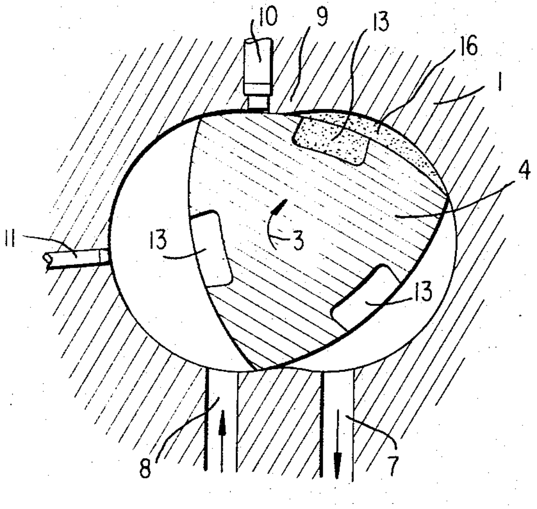
FIG. 4
INVENTOR
WOLF-DIETER BENSINGER
BY Dicke + Craig
ATTORNEYS United States Patent Office 3,344,778
Patented Oct. 3, 1967

1

3,344,778
ROTARY PISTON ENGINE

Wolf-Dieter Bensinger, Stuttgart-Unterturkheim, Germany, assignor to Daimler-Benz, Aktiengesellschaft, Stuttgart-Unterturkheim, Germany Continuation of application Ser. No. 280,375, May 14, 1963. This application July 22, 1966, Ser. No. 567,313
20 Claims. (Cl. 123—8)

This is a continuation of Ser. No. 280,375, filed May 14, 1963, now abandoned.

The present invention relates to a mixture-compressing rotary-piston injection-type internal combustion engine of trochoidal construction which comprises an enclosure body provided with an injection nozzle of which the multi-arched internal surfaces delimit together with lateral walls an internal space through which extends, perpendicularly to the lateral walls, an eccentric shaft, whereby a polygonal piston, which controls with the corners thereof the gas exchange channels provided in the enclosure body and which rotates at a fixed ratio to the rotational speed of the eccentric shaft, is supported on the eccentric of this shaft and is provided at the flanks thereof facing the internal surfaces of the enclosure body with combustion chamber recesses or troughs.

It has been repeatedly attempted, for purposes of reducing the fuel consumption especially with injection-type internal combustion engines of stroke-type piston construction, to achieve a stratification of the mixture within the combustion space in order to initiate by means of a fuel layer, enriched with fuel and therewith more readily ignitable, the combustion of the remainder relatively very lean charge. Tests and experiments of this type, however, proved for the most part rather little successful because it was, in practice, not possible to bring the fuel rich mixture as a unit up to in front of the ignition source or to hold the fuel rich mixture during the compression in proximity of the ignition source.

It has now been discovered that the much sought-after stratification of the mixture is possible with rotary-piston injection-type combustion engines of trochoidal construction with relatively slight expenditure by the fact that according to the present invention the fuel is injected into a combustion space recess or trough associated with a respective flank of the piston when the piston corner, which is coordinated to this flank and trails the same in the direction of rotation of the piston, begins to close or already has closed the inlet channel. The fuel injected into the combustion space recess remains preserved as fuel rich layer within the combustion space recess during the compression phase because the increasingly compressed air, with full-load injection also a relatively lean fuel air mixture, exerts a pressure from above upon the fuel rich layer in the combustion space recess. The fuel rich layer is thereby transported closed, so to speak, and in unison with the piston up to in front of the spark plug; this provides a relatively rapid ignition of the rich mixture which takes place thereat with short ignition paths. Rapid ignition is further aided by the fact that in the piston position corresponding to that in proximity to the upper dead center point in which the piston flank is brought or moved very closely adjacent to the internal surfaces of the enclosure body, the air lying ahead of the combustion space recess is pressed into the recess under eddying or vortexing formation.

In addition to a reduction in the fuel consumption and a relatively rapid combustion there is further achieved according to the present invention the advantage that the piston absorbs within the area of the corners thereof relatively little heat so that only relatively small loads or stresses occur at these sensitive places. As a further advantage, only the combustion space recess becomes hot so that the injected fuel may evaporate sufficiently during the long path of the piston. Since no long ignition paths occur, a relatively high compression may be chosen for the engine.

2

According to a further feature of the present invention at least the forward and rear walls, that is the leading and trailing walls of each combustion space recess as seen in the direction of rotation of the piston, may be constructed dropping off relatively steeply in the direction toward the bottom of the combustion space recess, preferably, however, in an overhanging manner, in order that the rich fuel layer is retained more effectively within the combustion space recess during the piston movement. Furthermore, each combustion space recess may advantageously be constructed as a part having a symmetry about an axis of rotation.

Accordingly, it is an object of the present invention to provide a mixture-compressing rotary-piston injection-type internal combustion engine which obviates the difficulties and shortcomings encountered with the prior art constructions mentioned hereinabove in an effective and reliable manner and requiring only relatively simple and inexpensive means.

It is another object of the present invention to provide a rotary-piston internal combustion engine, particularly of trochoidal construction in which the fuel consumption is considerably reduced as compared to the fuel consumption of the prior art constructions of similar engines.

Another object of the present invention resides in the provision of a rotary-piston internal combustion engine, particularly injection-type combustion engine of trochoidal construction, which may be readily designed for relatively high compression ratios.

Still another object of the present invention resides in the provision of a rotary-piston internal combustion engine, particularly injection-type engine, which permits an improved combustion process involving relatively short ignition paths.

Another object of the present invention resides in the provision of a rotary-piston internal combustion engine of the injection-type which effectively produces a stratification of the fuel mixture thereby permitting initiation of the ignition with a relatively rich fuel mixture even under partial or no-load operating conditions of the engine.

A further object of the present invention resides in the provision of a fuel injection system for internal combustion engines of trochoidal construction which not only effectively achieves stratification of the fuel charge but also produces vortexing of the combustion air.

A still further object of the present invention resides in the provision of a rotary-piston internal combustion engine of trochoidal construction provided with fuel injection in which the heat-sensitive areas, particularly the piston corners of the polygonal piston are far-reachingly protected against thermal overloads.

These and other objects, features and advantages of the present invention will become more obvious from the following description when taken in connection with the accompanying drawing which shows, for purposes of illustration only, one embodiment in accordance with the present invention, and wherein:

FIGURES 1 to 4 are schematic cross sectional views of the same mixture-compressing rotary-piston injection-type internal combustion engine of trochoidal construction in accordance with the present invention, illustrating in the various figures thereof the piston in the successive positions during the combustion process.

Referring now to the drawing in which like reference numerals are used throughout the various views to designate like parts, the rotary-piston injection-type internal combustion engine of trochoidal construction which is of the mixture-compressing type, is shown only schematically therein since the various parts are constructed in a conventional manner. The engine illustrated in these figures essentially consists of an enclosure body or housing 1 provided with two-arched internal surfaces 2 and of the piston 4 rotating in the direction of arrow 3. The piston 4 controls with the corners 5 thereof the gas exchange channels arranged within the area of the zone 6 of the inner surfaces 2 located in proximity to the axis, whereby of these gas exchange channels, the outlet channel 7 is disposed in front of and the inlet channel 8 to the rear of the zone 6 in proximity to the axis, as viewed in the direction of rotation of the piston. Opposite to the zone 6 approaching the axis is the other zone 9 also approaching the axis, within the area of which is arranged in the enclosure body 1, the ignition or spark plug 10, only schematically indicated in the drawing. Furthermore, the injection nozzle 11, also indicated only schematically, is arranged in the enclosure body 1, and more particularly substantially in a center position between the inlet channel 8 and the spark plug 10 in such a manner that the fuel jet is directed radially toward the piston 4. A combustion space recess 13 is provided in each flank 12 of the piston 4 of which the forward and rear walls 14, that is the leading and trailing walls thereof as viewed in a direction of rotation of the piston, are constructed in an overhanging manner with respect to the relatively flat bottom 15 thereof.

In FIGURE 1 the piston 4 assumes a position which corresponds to the lower dead center point in stroke-type piston engines. The one piston corner 5 commences to close the inlet channel 8 so that the compression of the air which was drawn-in into the working space 16 with the inlet channel 8 open, may take place within the working space 16. At the same time, fuel is injected by means of the injection nozzle 11 into the working space 16 in such a manner that the fuel jet 17 hits the combustion space recess 13 of the coordinated flank 12 of the piston 4 and thereby fills this combustion space recess 13 with fuel so that a relatively rich mixture is present therein. Whereas during partial load operation fuel will be present substantially only within the combustion space recess 13, a small portion of the fuel is present also outside of the combustion space recess 13 within the working space 16 during full-load operation during which the injection lasts somewhat longer time-wise.

The fuel thus injected into the combustion space recess 13 remains confined within this combination space recess during the further movement of the piston 4 in the direction of the arrow 3 because the volume of the working space 16 is compressed and the combustion air thereby presses from above on the rich fuel layer.

When the piston 4 arrives in the position of FIGURE 2, the combustion air disposed in front of the spark plug 10 is pressed into the combustion space recess 13 under formation of a vortexing or eddying swirl as indicated by the arrow since the air no longer can travel along the piston.

The rapid ignition of the rich mixture within the combustion space recess 13 takes place in the next position of the piston illustrated in FIGURE 3 by means of spark plug 10 because the combustion space recess 13 containing the rich mixture is guided very closely adjacent to the spark plug 10 whereby the thus ignited rich mixture subsequently and immediately ignites the relatively lean mixture present in the working space 16.

As the piston 4 after leaving the position of FIGURE 3 now reaches the position of FIGURE 4, the working space 16 increases and an inflow of the combusted gases from the combustion space recess into the working space now takes place. Subsequently, the combusted gases are pushed out of the engine by the piston through the outlet or exhaust channel 7.

Since during operation of the internal combustion engine according to the present invention a stratification of the mixture takes place, the fuel consumption is very low. The combustion takes place very rapidly because the combustion space filled with ignitable mixture is compact and offers short ignition paths. The piston corners together with the sealing ledges are exposed only relatively slightly to the heat. Since relatively short ignition paths are realized, the compression of the engine may be considerably increased. The combustion space recess in which the rich mixture is stored and evaporated, is well cooled in each case by the injected fuel so that the thermal loads or stresses of the piston can be readily kept within acceptable limits.

While I have shown and described one embodiment in accordance with the present invention, it is understood that the same is not limited thereto but is susceptible of numerous changes and modifications as known to a person skilled in the art. For example, the housing forming the enclosure body and the piston may have any known configuration utilizable for the purposes of the present invention. Additionally, any suitable gearing or other means may be used to achieve the particular rotary movements of the piston as required by the trochoidal construction.

Thus, it is obvious that the present invention is not limited to the details shown and described herein but is susceptible of numerous changes and modifications as known to a person skilled in the art, and I therefore do not wish to be limited to these details but intend to cover all such changes and modifications as are encompassed by the scope of the appended claims.

What I claim is:

1. A mixture-compressing injection-type internal combustion engine of trochoidal construction, comprising: housing means provided with multi-arched internal surface means and including side wall means, shaft means provided with eccentric means extending through said side wall means substantially perpendicularly, means for supporting said shaft means in said side wall means, polygonal piston means adapted to rotate within said housing means and provided with piston flanks, an internal space being defined by said side wall means and said surface means in which said piston means is accommodated, said housing means being provided with inlet and outlet channel means terminating in said internal space and effectively valved by the corners of said piston means, said piston means being provided in each piston flank with combustion space recess means, and fuel injection means in said housing means for injecting a fuel jet substantially into said recess means at a time when the trailing piston corner coordinated to the respective flank, as seen in the direction of rotation has begun to close the inlet channel means.

2. A mixture-compressing injection-type internal combustion engine of trochoidal construction, comprising: housing means provided with multi-arched internal surface means and including side wall means, shaft means provided with eccentric means extending through said side wall means substantially perpendicularly, means for supporting said shaft means in said side wall means, polygonal piston means adapted to rotate within said housing means and provided with piston flanks, an internal space being defined by said side wall means and said surface means in which said piston means is accommodated, said housing means being provided with inlet and outlet channel means terminating in said internal space and effectively valved by the corners of said piston means, said piston means being provided in each piston flank with combustion space recess means, and fuel injection means in said housing means for injecting a fuel jet substantially into said recess means at a time when the trailing piston corner coordinated to the respective flank, as seen in the direction of rotation has begun to close the inlet channel means, at least the leading and trailing walls of said recess means dropping off relatively steeply with respect to the bottom of said recess means.

3. A mixture-compressing injection-type internal combustion engine of trochoidal construction, comprising housing means provided with multi-arched internal surface means and including side wall means, shaft means provided with eccentric means extending through said side wall means substantially perpendicularly, means for supporting said shaft means in said side wall means, polygonal piston means adapted to rotate within said housing means and provided with piston flanks, an internal space being defined by said side wall means and said surface means in which said piston means is accommodated, said housing means being provided with inlet and outlet channel means terminating in said internal space and effectively valved by the corners of said piston means, said piston means being provided in each piston flank with combustion space recess means, and fuel injection means in said housing means for injecting a fuel jet substantially into said recess means at a time when the trailing piston corner coordinated to the respective flank, as seen in the direction of rotation has begun to close the inlet channel means, and said combustion space recess means being of a construction symmetrical with respect to the axis of rotation.

4. A mixture-compressing injection-type internal combustion engine of trochoidal construction, comprising: housing means provided with multi-arched internal surface means and including side wall means, shaft means provided with eccentric means extending through said side wall means substantially perpendicularly, means for supporting said shaft means in said side wall means, polygonal piston means adapted to rotate within said housing means and provided with piston flanks, an internal space being defined by said side wall means and said surface means in which said piston means is accommodated, said housing means being provided with inlet and outlet channel means terminating in said internal space and effectively valved by the corners of said piston means, said piston means being provided in each piston flank with combustion space recess means, and fuel injection means in said housing means for injecting a fuel jet substantially into said recess means at a time when the trailing piston corner coordinated to the respective flank, as seen in the direction of rotation has begun to close the inlet channel means, said multi-arched surface means having two zones approaching the axis of rotation of said shaft means, said inlet and outlet channel means being located within the area of one of said zones, and ignition means located in said housing means within the area of the other of said zones, at least the leading and trailing walls of said recess means dropping off relatively steeply with respect to the bottom of said recess means in such a manner as to effectively provide an overhang, and said combustion space recess means being of a construction symmetrical with respect to the axis of rotation.

5. A mixture-compressing injection-type internal combustion engine of trochoidal construction, comprising: housing means provided with multi-arched internal surface means, shaft means provided with eccentric means in said housing means, polygonal piston means accommodated within said housing means, said housing means being provided with inlet and outlet channel means which are effectively valved by the corners of said piston means, said piston means being provided with combustion space recess means, and fuel injection means in said housing means for injecting fuel into said recess means approximately at a time when the trailing piston corner coordinated to the respective flank, as seen in the direction of rotation has begun to close the inlet channel means.

6. A mixture-compressing injection-type internal combustion engine of trochoidal construction, comprising: housing means provided with multi-arched internal surface means and including side wall means, shaft means provided with eccentric means extending through said side wall means substantially perpendicularly, means for supporting said shaft means in said side wall means, polygonal piston means adapted to rotate within said housing means and provided with piston flanks, an internal space being defined by said side wall means and said surface means in which said piston means is accommodated, said housing means being provided with inlet and outlet channel means terminating in said internal space and effectively valved by the corners of said piston means, said piston means being provided in each piston flank with combustion space recess means, and fuel injection means in said housing means for injecting a fuel jet substantially into said recess means at a time when the trailing piston corner coordinated to the respecitve flank, as seen in the direction of rotation has begun to close the inlet channel means, said multi-arched surface means having two zones approaching the axis of rotation of said shaft means, said inlet and outlet channel means being located within the area of one of said zones, and ignition means located in said housing means within the area of the other of said zones.

7. In a mixture-compressing injection-type internal combustion engine of trochoidal construction which comprises a housing forming an enclosure body provided with multi-arched inner surfaces defining in part an internal space, a shaft having an eccentric and extending through the housing, and a polygonal piston rotatably supported on said eccentric and controlling with the corners thereof the gas exchange channels provided within the enclosure body and rotating at a predetermined fixed ratio to the rotational speed of the shaft, the improvement essentially consisting of providing said piston with combustion space recess means in the piston flanks, and means for injecting fuel into the combustion space recess means coordinated to a respective piston flank substantially at the moment the piston corner coordinated to said flank and trailing the same in the direction of rotation of the piston has commenced to close the inlet channel of said gas exchange channels.

8. A mixture-compressing injection-type internal combustion engine of trochoidal construction, comprising: housing means provided with multi-arched internal surface means and including side wall means, shaft means provided with eccentric means extending through said side wall means substantially perpendicularly, means for supporting said shaft means in said side wall means, polygonal piston means adapted to rotate within said housing means and provided with piston flanks, an internal space being defined by said side wall means and said surface means in which said piston means is accommodated, said housing means being provided with inlet and outlet channel means, terminating in said internal space and effectively valved by the corners of said piston means, said piston means being provided in each piston flank with combustion space recess means, and fuel injection means independent of said inlet channel means in said housing means for injecting a fuel jet substantially into said recess means at a time when the trailing piston corner coordinated to the respective flank, as seen in the direction of rotation has begun to close the inlet channel means, at least the leading and trailing walls of said recess means dropping off relatively steeply with respect to the bottom of said recess means, and said combustion space recess means being of a construction symmetrical with respect to an axis of rotation.

9. A mixture-compressing injection-type internal combustion engine of trochoidal construction, comprising: housing means provided with multi-arched internal surface means, shaft means provided with eccentric means in said housing means, polygonal piston means within said housing means, said housing means being provided with inlet and outlet channel means adapted to be opened and closed, said piston means being provided with combustion space recess means, and fuel injection means independent of said inlet channel means in said housing means for injecting fuel substantially into said recess means at a time when closure of said inlet channel means is about to begin.

10. A mixture-compressing injection-type internal combustion engine of trochoidal construction, comprising: housing means provided with multi-arched internal surface means and including side wall means, shaft means side wall means substantially perpendicularly, means for provided with eccentric means extending through said supporting said shaft means in said side wall means, polygonal piston means adapted to rotate within said housing means and provided with piston flanks, an internal space being defined by said side wall means and said surface means in which said piston means is accommodated, said housing means being provided with inlet and outlet channel means terminating in said internal space and effectively valved by the corners of said piston means, said piston means being provided in each piston flank with combustion space recess means, and fuel injection means in said housing means for injecting a fuel jet substantially into said recess means at a time when the trailing piston corner coordinated to the respective flank, as seen in the direction of rotation has begun to close the inlet channel means, at least the leading and trailing walls of said recess means dropping off relatively steeply with respect to the bottom of said recess means in such a manner as to effectively provide an overhang.

11. In a mixture-compressing injection-type internal combustion engine of trochoidal construction which comprises a housing forming an enclosure body provided with multi-arched inner surfaces defining in part an internal space, a shaft having an eccentric and extending through the housing, and a polygonal piston rotatably supported on said eccentric and controlling with the corners thereof the gas exchange channels provided within the enclosure body and rotating at a predetermined fixed ratio to the rotational speed of the shaft, the improvement essentially consisting of providing said piston with combustion space recess means in the piston flanks, and means for injecting fuel into the combustion space recess means coordinated to a respective piston flank substantially at the moment the piston corner coordinated to said flank and trailing the same in the direction of rotation of the piston has commenced to close the inlet channel of said gas exchange channels, at least the forward and rearward walls of each combustion space as viewed in the direction of rotation of the piston dropping off relatively steeply toward the bottom of the combustion space recess.

12. In a mixture-compressing injection-type internal combustion engine of trochoidal construction which comprises a housing forming an enclosure body provided with multi-arched inner surfaces defining in part an internal space, a shaft having an eccentric and extending through said housing, polygonal piston rotatably supported on said eccentric, exchange channels including inlet and outlet channels provided within the enclosure body, and means for selectively opening and closing said channels, the improvement essentially consisting of providing combustion space recess means in said piston, and means independent of the exchange channels for injecting the fuel into the combustion space recess means during a period when closure of said inlet channel is about to begin.

13. The engine according to claim 9, wherein said fuel injection means injects the fuel when the trailing sealing edge of said piston means is between said inlet and said outlet means, and said fuel injection means terminates the fuel injection before said inlet means is completely closed by the trailing sealing edge of said piston.

14. The engine according to claim 12, wherein said fuel injection means injects the fuel when the trailing sealing edge of said piston means is between said inlet and said outlet means, and said fuel injection means terminates the fuel injection before said inlet means is completely closed by the trailing sealing edge of said piston.

15. A mixture comprising injection type internal combustion rotary piston engine, comprising:

housing means, piston means mounted for rotation in said housing means having an axis of symmetry, transverse sealing edges and flank portion therebetween; said housing means and piston means forming a plurality of separate combustion chambers; exhaust means, inlet means, fuel injection nozzle means, and ignition means mounted in said housing means and each respectively spaced from the other in the direction of rotation; combustion space recess means in each of said flank portions; said injection means being operable to deliver the major portion of the fuel into said recess means after the corresponding trailing edge of said portion means has passed said exhaust means and before said piston means rotates sufficiently to produce any substantial compression; said recess means having trailing wall means being operable to retain the major portion of the fuel within said recess while said piston means rotates during compression to form a rich mixture in said recess means for ignition by said ignition means after compression.

16. The engine according to claim 15, wherein said recess means has trailing walls extending generally radially with respect to said axis of symmetry.

17. The engine according to claim 16, wherein said combustion space recess means is symmetrical with respect to said axis.

18. The engine according to claim 16, wherein said recess means has leading walls extending substantially radially with respect to said axis of symmetry.

19. The engine according to claim 16, wherein the angle betwen said trailing walls and the respective flank portions of said piston means at the point of intersection of said trailing walls and said flank portions being acute to effectively provide an overhang for retaining the fuel in said recess means during rotation of said piston means.

20. The engine according to claim 19, wherein said recess means is symmetrical with respect to said axis of symmetry.

References Cited

UNITED STATES PATENTS

| | | | |
|---|---|---|---|
| 2,027,972 | 1/1936 | Haller et al. | 123—8 |
| 2,050,603 | 8/1936 | Gardner | 123—8 |
| 2,283,433 | 5/1942 | Gross | 123—8 |
| 3,053,238 | 9/1962 | Meurer | 123—8 |
| 3,079,901 | 3/1963 | Hallberg | 123—32.2 |
| 3,136,302 | 6/1964 | Nallinger et al. | 123—8 |
| 3,168,078 | 2/1965 | Lamm | 123—8 |
| 3,174,466 | 3/1965 | Scherenberg | 123—8 |
| 3,190,269 | 6/1965 | Tado | 123—8 |

FOREIGN PATENTS

| | | |
|---|---|---|
| 1,287,176 | 1/1962 | France. |
| 1,306,361 | 9/1962 | France. |
| 869,445 | 3/1953 | Germany. |

OTHER REFERENCES

Wankel et al. Bauart und gegenwartiger Entwicklungsstand einer Trochoiden - Rotationskolbenmaschine. In MTZ. 21(2); pp. 33–45. February 1960.

MARK M. NEWMAN, *Primary Examiner.*

RALPH D. BLAKESLEE, *Examiner.*

UNITED STATES PATENT OFFICE
CERTIFICATE OF CORRECTION

Patent No. 3,344,778 October 3, 1967

Wolf-Dieter Bensinger

It is hereby certified that error appears in the above numbered patent requiring correction and that the said Letters Patent should read as corrected below.

In the heading to the printed specification, after line 7, insert -- Claims priority, application Germany, May 17, 1962, D38,939 --.

Signed and sealed this 1st day of April 1969.

(SEAL)
Attest:

Edward M. Fletcher, Jr.
Attesting Officer

EDWARD J. BRENNER
Commissioner of Patents